United States Patent [19]
Herbst

[11] Patent Number: 4,883,088
[45] Date of Patent: * Nov. 28, 1989

[54] PRESSURE REGULATING APPARATUS

[75] Inventor: Kurt Herbst, Burgstetten, Fed. Rep. of Germany

[73] Assignee: Robert Bosch GmbH, Stuttgart, Fed. Rep. of Germany

[*] Notice: The portion of the term of this patent subsequent to May 3, 2005 has been disclaimed.

[21] Appl. No.: 178,419

[22] Filed: Apr. 6, 1988

Related U.S. Application Data

[63] Continuation-in-part of Ser. No. 931,811, Nov. 18, 1986, Pat. No. 4,741,315.

Foreign Application Priority Data

May 15, 1987 [DE] Fed. Rep. of Germany ....... 3716316

[51] Int. Cl.$^4$ ............................................ F02M 39/00
[52] U.S. Cl. ..................... 137/510; 123/463; 123/467; 137/550; 251/367
[58] Field of Search .............. 123/456, 463, 467; 137/510, 859, 550; 251/367, 63.5

[56] References Cited

U.S. PATENT DOCUMENTS

| | | | |
|---|---|---|---|
| 1,496,935 | 6/1924 | Lemmon | 137/550 X |
| 3,069,130 | 12/1962 | Grove | 251/367 X |
| 3,085,780 | 4/1963 | Yale | 251/367 X |
| 3,297,260 | 1/1967 | Barlow | 137/550 X |
| 3,451,423 | 6/1969 | Priese | 251/63.5 X |
| 3,467,357 | 9/1969 | Schomer et al. | 251/367 X |
| 4,679,537 | 7/1987 | Fehrenbach et al. | |
| 4,741,315 | 5/1988 | Fehrenbach et al. | 123/463 |
| 4,756,289 | 7/1988 | Rock et al. | 123/463 |

Primary Examiner—Stephen M. Hepperle
Attorney, Agent, or Firm—Edwin E. Greigg

[57] ABSTRACT

In known pressure regulating apparatus, the pressure regulating valve placed in a holder is provided with a plunge-cut sealing groove for receiving a sealing ring. A filter is also disposed inside the pressure regulating valve. The novel embodiment of the pressure regulating apparatus is intended to make it easier to embody and install the seal between the holder and the pressure regulating valve. To avoid a plunge cut on the bottom part of the valve housing of the pressure regulating valve, the bottom part is provided with a step, defining one side of a sealing groove, while the sealing groove bottom is formed by a restriction extending as far as one end face of the bottom part. The sealing ring is defined on the other side by a ring, which is placed upon the restriction, and being connected with a filter disk extending radially inward and serves as a retaining means for the filter disk. Defining a sealing groove by means of a ring is applicable to other apparatus, in which a sealing ring is to be retained, as well.

2 Claims, 1 Drawing Sheet

PRESSURE REGULATING APPARATUS

This is a continuation-in-part of application Ser. No. 931,811, filed Nov. 18, 1986, now U.S. Pat. No. 4,741,315.

BACKGROUND OF THE INVENTION

The invention is based on a pressure regulating apparatus as defined hereinafter. In a pressure regulating device, a sealing groove machined into the valve housing and into which an elastic seal is placed has already been proposed. To make this groove, the additional step of making a plunge cut is necessary, and the sealing ring has to be stretched in order to introduce it into the sealing groove. This application is an improvement over U.S. Pat. No. 4,679,537 and other pending applications all of which are owned by the assignee of this invention.

OBJECT AND SUMMARY OF THE INVENTION

The pressure regulating apparatus has the advantage over the prior art that the sealing groove can be provided in the form of a step on the valve housing, on the one hand, and that further axial limitation of the sealing groove is easily attained by means of an easily manufactured ring. The seal can therefore be slipped onto the valve housing without being radially stretched.

A particularly advantageous feature of the pressure regulating apparatus according to the invention is that the ring gripping the filter disk on its outside circumference, which is used for retention of the filter disk, at the same time effects the axial limitation of the sealing groove.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
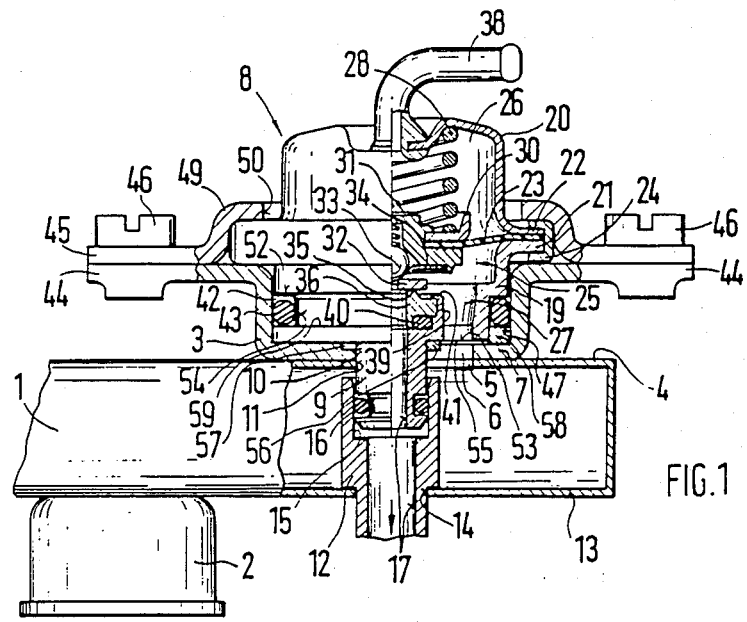
FIG. 1 is a simplified generally crosssectioned view of a first exemplary embodiment of a pressure regulating apparatus.
Figure 2:
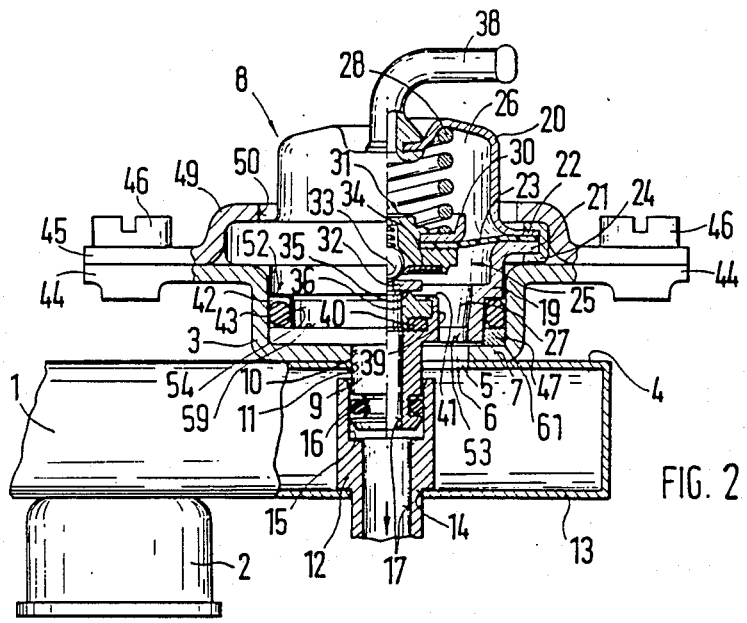
FIG. 2 is a simplified generally crosssectioned view of a second exemplary embodiment of a pressure regulating apparatus.

In FIGS. 1 and 2, a rigid fuel distributor line 1 is shown, for example made from metal, for a fuel injection system for internal combustion engines. It has a plurality of plug connections 2, into which the fuel injection valves are inserted with one end. A cup-shaped holder 3 is joined, for instance by soldering or welding, to the wall of the fuel distributor line 1. The holder 3 may also be molded onto the fuel distributor line and/or may protrude at least partway into the fuel distributor line 1. At least one inlet opening 5 is let into the wall 4 of the fuel distributor line 1 oriented toward the holder 3 and is aligned with the connecting opening 6 in the bottom 7 of the holder 3. The inlet opening 5 and the connecting opening 6 may also be annular in shape. A pressure regulating valve 6 is inserted into a guide bore 47 in the holder 3, protruding sealingly into an outlet pipe connector 12 through a first insertion opening 10 in the bottom of the holder 3 and a second insertion opening 11 in the wall 4 of the fuel distributor line 1. The outlet pipe connector 12 protrudes with a valve seat holder body 9 into the fuel distributor line 1 and penetrates the wall 13, remote from the pressure regulating valve 8, of the fuel distributor line 1, in an opening 14 in which it is tightly secured, for example by soldering. Instead of the separate insertion openings 10, 11, the inlet opening 5 and the connecting opening 6 may also be embodied as large enough that the valve seat holder body 9 can be passed through the inlet opening 5 and the connecting opening 6 while maintaining a sufficiently large flow cross section about its circumference. With its end protruding from the pressure regulating valve 8, the valve seat holder body 9 protrudes into a receiving bore 15 of outlet connector 12 and is provided on its circumference with an elastic sealing ring 16 for sealing off relative to the receiving bore 15. An outlet conduit 17, which in a manner not shown leads to a fuel container or to the intake side of a fuel feed pump, penetrates the outlet connector 12 in the axial direction. The fuel distributor line 1 communicates with a fuel supply line that is connected to the pumping outlet of the fuel feed pump.

The valve housing of the pressure regulating valve 8 is formed by a bottom part 19 and a cap 20. The bottom part 19 inserted into the holder 3 and has the valve seat holder body 9, which is either joined as an independent part to the bottom part 19 or is part of the bottom part 19 itself. The bottom part 19 has a collar 21 and the cap 20 has a collar 22, the two collars facing one another, and between them a resilient valve diaphragm 23 is fastened by means of a crimped edge, not shown, or a separate crimped ring 24. This diaphragm 23 divides a fuel chamber 25 in the bottom part 19 from a spring chamber 26 in the cap. The bottom part 19 is penetrated in the axial direction by at least one inflow opening 27, which is aligned with the connecting opening 6, so that the inlet opening 5, the connecting opening 6 and the inflow opening 27 serve as an inlet conduit, by way of which fuel can flow from the fuel distributor line 1 into the fuel chamber 25. A compression spring 28, supported at one end on the cap 20 and at the other on a spring plate 30, is disposed in the spring chamber 26, being secured to the valve diaphragm 23 by a rivet connection 31 extending in a sealed manner through the valve diaphragm 23. The rivet connection 31 includes an axial aperture provided with a ball 33 and a spring held by a clamp 34 urges the ball downwardly against a valve plate 32. The valve plate 32 is urged by the compression spring 28 toward a valve seat 35, which is embodied on a valve seat body 36 and at which the outlet conduit 17 originates. If the fuel pressure in the fuel distributor line and hence in the fuel chamber 25 as well rises above a value that is predetermined by the force of the compression spring 28, then the valve plate 32 is lifted from the valve seat 35, and fuel can flow out via the outlet conduit 17.

By way of an air connection fitting 38 secured to the cap 20, the spring chamber 26 can be made to communicate, by means of a hose connection, not shown, with the air intake tube of the engine downstream of a throttle valve.

The valve seat holder body 9 has a retaining bore 39 on its end oriented toward the fuel chamber 25. The valve seat body 36 is inserted into this bore 39 and held tightly in it by means of a crimped edge 41, with an interposed elastic sealing ring 40, so that even when the pressure regulating valve is closed, that is, whenever the valve plate 32 is resting on the valve seat 35, no leaking fuel from the fuel chamber 25 can get into the outlet conduit 17 via the retaining bore 39.

A radially open sealing groove 42 is provided on the circumference of the bottom part 19, and in this groove is a seal that seals in the radial direction and is embodied as an elastic sealing ring 43. In one area, leading axially away from the bottom 7, the holder 3 encompasses the bottom part 19 of the pressure regulating valve 8 at least completely enough that secure sealing between the bottom part 19 and the holder 3 is assured by the sealing ring 43.

For axial fixation of the pressure regulating valve 8 in the holder 3, the holder 3 can be provided, on its end remote from the fuel distributor line 1, with at least two flanges 44 extending approximately parallel to the fuel distributor line and away from the pressure regulating valve, and at least one retaining body 45, connected to the flanges 44 by screws 46, rests on the flanges remote from the fuel distributor line 1. The pressure regulating valve 8 has a larger diameter, in the radial direction in the vicinity of the crimped ring 24, than the guide bore 47 of the holder 3 into which the pressure regulating valve 8 is inserted, so that the crimped ring 24 rests on the flanges 44. Remote from the flanges 44, the retaining body 45 has an angled step 49, which engages the crimped ring 24 opposite the flanges 44 and by means of the screw connection 46 fixes the pressure regulating valve 8 axially on the flanges 44. The angled step 49 may be embodied annularly and may be provided with an insertion opening 50, through which the cap 20 of the pressure regulating valve protrudes.

The sealing groove 42 is advantageously embodied on one side in the axial direction by a step 52 of the bottom part 19, on which the sealing ring 43 can rest on its side remote from the fuel distributor line 1, while the groove bottom is formed by a cylindrical restriction 54 extending as far as one end face 53 of the bottom part. A filter disk 55 is disposed between the bottom 7 of the holder 3 and the end face 53 of the bottom part 19, extending in the radial direction between the valve seat holder body 9 and the restriction 54. The filter disk 55 covers the at least one inflow opening 27, so that the fuel flowing in via the inlet opening 5 and the connecting opening 6 from the fuel distributor line 1 has to flow through this filter disk 55 in order to reach the fuel chamber 25, so that any particles entrained with the fuel are trapped. The filter disk 55 has an annular inside frame 56 that encompasses the valve seat body 9 and is guided in a groove 57 of the bottom 7, engaging the valve seat holder body 9. On its outside circumference the filter disk 55 is connected to a ring 58, which overlaps the restriction 54 of the bottom part 19 and extends radially as far as the vicinity of the guide bore 47, while its annular face 59 remote from the bottom 7 is oriented toward the sealing ring 43 and defines the sealing groove 42 on its other side. The filter disk 55, the inside frame 56 and the ring 58 can be made from plastic and are seated on the outside of the pressure regulating valve 8. The ring 58 performs, first, the function of retaining the filter disk 55, and second, the function of defining the sealing groove 42. If a filter should be unnecessary, then instead of the filter disk 55, the inside frame 56 and the ring 58, a similarly shaped disk-like body, provided with openings for the passage of fuel and having a ring 58 that takes on the function of defining the sealing groove 42, can be used.

In the exemplary embodiment shown in FIG. 2, elements identical to and having the same function as those of FIG. 1 are identified by the same reference numerals. Differing from the exemplary embodiment of FIG. 1, no inside frame 56 or filter disk 55 is provided in the exemplary embodiment of FIG. 2. Instead, a ring 61, for instance made of plastic, is merely seated on the restriction 54; this ring 61 defines the sealing groove 42 on the side remote from the step 52, extending in the radial direction between the restriction 54 and the guide bore 47 of the holder 3 and resting on the bottom 7. Thus, as in the exemplary embodiment of FIG. 1, the sealing ring 43 can be slipped without stretching over the restriction 54 of the bottom part 19 as far as the step 52 and then, by means of the ring 58 or 61 likewise slipped onto the restriction 54, to define the sealing groove 42. In this state ready for installation, the pressure regulating valve 8 can then be inserted into the guide bore 47 and fixed in the holder 3.

The foregoing relates to preferred exemplary embodiments of the invention, it being understood that other variants and embodiments thereof are possible within the spirit and scope of the invention, the latter being defined by the appended claims.

What is claimed and desired to be secured by letters Patent of the United States is:

1. A pressure regulating apparatus having a pressure regulating valve, disposed on and connected to a rigid fuel distributor line for supplying fuel to fuel injection valves of a fuel injection system for internal combustion engines, the regulating valve having a resilient wall that divides a spring chamber from a fuel chamber in the valve housing and arranged to cooperate with a valve seat in the fuel chamber, at least one inflow opening arranged to connect the fuel chamber with the fuel distributor line, and an outlet conduit adapted to lead from the valve seat, via a valve seat body and an outlet connector, to a fuel return line, a cup-shaped holder having a bottom tightly connected to the fuel distributor line, the holder arranged to at least completely encompass the valve housing of the pressure regulating valve in the axial direction and in a region which leads away from the fuel distributor line, an elastic seal disposed in said region, between the valve housing and the holder, in a sealing groove that is defined, remote from the bottom of the holder, in the axial direction by a step of the valve housing, characterized in that on the side of the seal (43) remote from the step (52), the sealing groove (42) is defined axially by a separate ring (58, 61), which is adapted to rest on the bottom (7) of the holder (3).

2. A pressure regulating apparatus as defined by claim 1, in which a filter disk (55) is disposed between the bottom (7) of the holder (3) and a bottom portion (19) of the valve housing, said filter disk being connected to the separate ring (58) which defines the sealing groove (42) and adapted to cover the at least one inflow opening (27) of the pressure regulating valve (8).

* * * * *